US012563201B2

(12) United States Patent
Li et al.

(10) Patent No.: US 12,563,201 B2
(45) Date of Patent: Feb. 24, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Xueqing Li, Beijing (CN); Siping Tao, Los Angeles, CA (US); Li Zhang, Los Angeles, CA (US); Yuwen He, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 37 days.

(21) Appl. No.: 18/585,005

(22) Filed: Feb. 22, 2024

(65) Prior Publication Data

US 2024/0205417 A1 Jun. 20, 2024

Related U.S. Application Data

(63) Continuation of application No. PCT/CN2022/114420, filed on Aug. 24, 2022.

(30) Foreign Application Priority Data

Aug. 24, 2022 (WO) ............... PCT/CN2022/114420

(51) Int. Cl.
*H04N 19/154* (2014.01)
*H04N 19/109* (2014.01)
*H04N 19/119* (2014.01)
*H04N 19/132* (2014.01)
*H04N 19/139* (2014.01)
(Continued)

(52) U.S. Cl.
CPC ......... *H04N 19/154* (2014.11); *H04N 19/109* (2014.11); *H04N 19/119* (2014.11);
(Continued)

(58) Field of Classification Search
CPC .. H04N 19/103; H04N 19/109; H04N 19/117; H04N 19/119; H04N 19/132;
(Continued)

(56) References Cited

U.S. PATENT DOCUMENTS

2012/0163452 A1* 6/2012 Horowitz ................ C12P 17/14
375/E7.243
2012/0170649 A1* 7/2012 Chen .................... H04N 19/122
375/240.18
(Continued)

FOREIGN PATENT DOCUMENTS

CN 110754089 A 2/2020
CN 113170185 A 7/2021
WO 2020200159 A1 10/2020

OTHER PUBLICATIONS

Ito, Yuichi, et al. "Datamoshing technique for video art production." The journal of the Society For Art and Science 13.3 (2014): 154-168. (Yuichi).*
(Continued)

*Primary Examiner* — Shahan Ur Rahaman
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a target video block of a video and a bitstream of the video, whether an artifact coding tool is enabled, the artifact coding tool being used to generate an artifact effect in the video; in response to the artifact coding tool being enabled, determining at least one candidate coding tool from a plurality of coding tools; and performing the conversion by enabling the at least one candidate coding tool.

19 Claims, 10 Drawing Sheets

1200

DETERMINE, DURING A CONVERSION BETWEEN A TARGET VIDEO BLOCK OF A VIDEO AND A BITSTREAM OF THE VIDEO, WHETHER AN ARTIFACT CODING TOOL IS ENABLED — 1202

Y

DETERMINE AT LEAST ONE CANDIDATE CODING TOOL FROM A PLURALITY OF CODING TOOLS — 1204

PERFORM THE CONVERSION BY ENABLING THE AT LEAST ONE CANDIDATE CODING TOOL — 1206

(51) Int. Cl.

| | |
|---|---|
| *H04N 19/167* | (2014.01) |
| *H04N 19/176* | (2014.01) |
| *H04N 19/463* | (2014.01) |
| *H04N 19/52* | (2014.01) |
| *H04N 19/82* | (2014.01) |

(52) U.S. Cl.
CPC ......... *H04N 19/132* (2014.11); *H04N 19/139* (2014.11); *H04N 19/167* (2014.11); *H04N 19/176* (2014.11); *H04N 19/463* (2014.11); *H04N 19/52* (2014.11); *H04N 19/82* (2014.11)

(58) Field of Classification Search
CPC .. H04N 19/139; H04N 19/154; H04N 19/167; H04N 19/176; H04N 19/463; H04N 19/52; H04N 19/523; H04N 19/82; H04N 19/86
See application file for complete search history.

(56) References Cited

U.S. PATENT DOCUMENTS

| | | | | |
|---|---|---|---|---|
| 2014/0072057 | A1* | 3/2014 | Tourapis | H04N 19/117 |
| | | | | 375/240.12 |
| 2019/0158843 | A1* | 5/2019 | Xu | H04N 19/139 |
| 2020/0204807 | A1* | 6/2020 | Ye | H04N 19/577 |

OTHER PUBLICATIONS

Lim, Y. et al."OMAF: Metadata for Maintaining Creative Intent in ROI Rendering" 17. MPEG Meet! NG; Jan. 16, 2017 Jan. 20, 2017; Geneva; (Motion Picture Expert Group or ISO/IEC JTC1/SC29/WG11) Jan. 12, 2017.*
International Search Report in PCT/CN2022/114420, mailed Nov. 22, 2022, 3 pages.

* cited by examiner

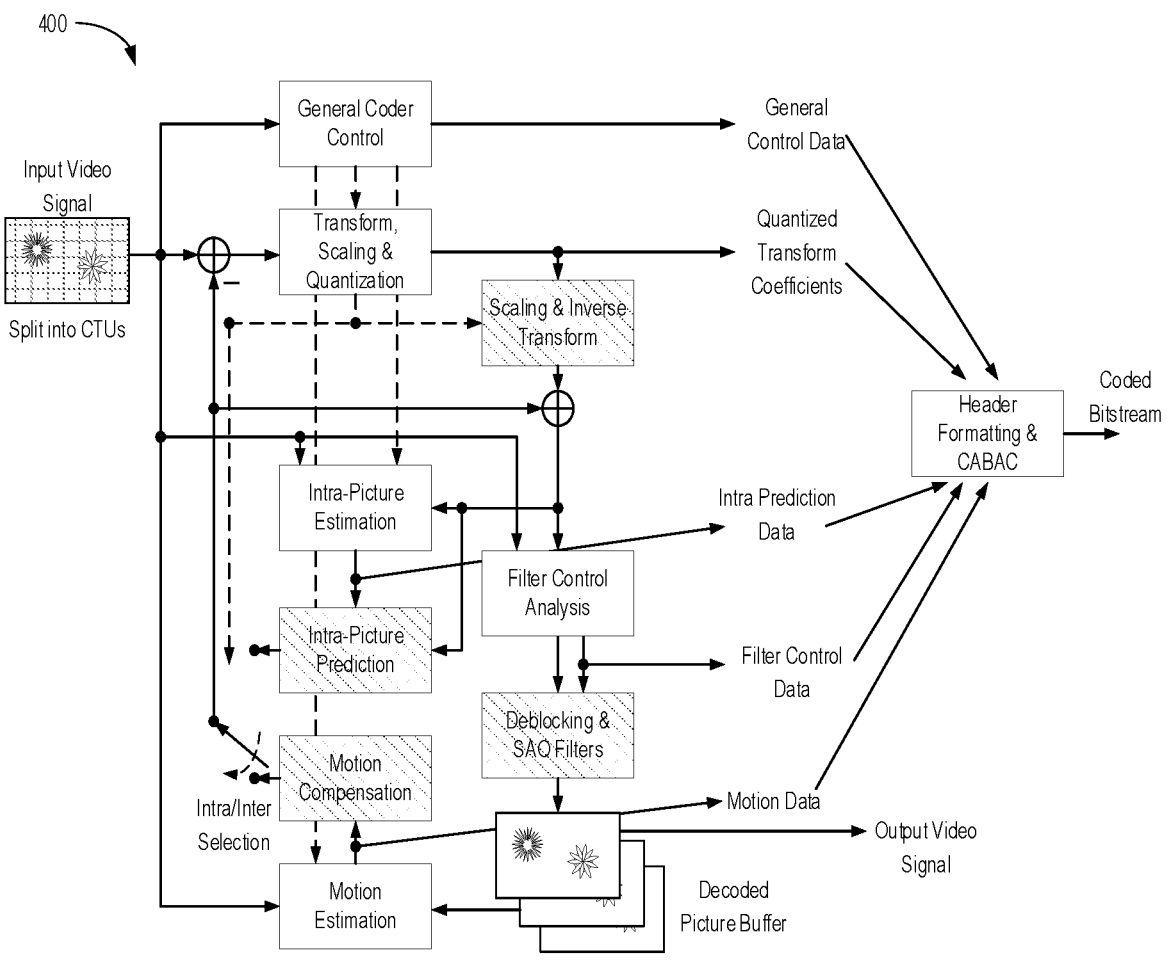

400

Input Video
Signal

Split into CTUs

General Coder
Control

General
Control Data

Transform,
Scaling &
Quantization

Quantized
Transform
Coefficients

Scaling & Inverse
Transform

Intra-Picture
Estimation

Intra Prediction
Data

Intra-Picture
Prediction

Filter Control
Analysis

Motion
Compensation

Deblocking &
SAO Filters

Filter Control
Data

Intra/Inter
Selection

Motion
Estimation

Decoded
Picture Buffer

Motion Data

Output Video
Signal

Header
Formatting &
CABAC

Coded
Bitstream

| | | | | | | | | |
|---|---|---|---|---|---|---|---|---|
POC | 0 | 1 | 2 | 3 | 4 | 5 | 6 | 7 | 8
Decode Order | 0 | 3 | 2 | 4 | 1 | 7 | 6 | 8 | 5

1200

DETERMINE, DURING A CONVERSION BETWEEN A TARGET VIDEO BLOCK OF A VIDEO AND A BITSTREAM OF THE VIDEO, WHETHER AN ARTIFACT CODING TOOL IS ENABLED — 1202

Y

DETERMINE AT LEAST ONE CANDIDATE CODING TOOL FROM A PLURALITY OF CODING TOOLS — 1204

PERFORM THE CONVERSION BY ENABLING THE AT LEAST ONE CANDIDATE CODING TOOL — 1206

METHOD, APPARATUS, AND MEDIUM FOR VIDEO PROCESSING

CROSS-REFERENCE TO RELATED APPLICATIONS

This application is a continuation of International Application No. PCT/CN2022/114420, filed on Aug. 24, 2022, which claims the benefit of International Application No. PCT/CN2021/114395 filed on Aug. 24, 2021. The entire contents of these applications are hereby incorporated by reference in their entireties.

FIELD

Embodiments of the present disclosure relates generally to video coding techniques, and more particularly, to artifact video coding.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target video block of a video and a bitstream of the video, whether an artifact coding tool is enabled, the artifact coding tool being used to generate an artifact effect in the video; in response to the artifact coding tool being enabled, determining at least one candidate coding tool from a plurality of coding tools; and performing the conversion by enabling the at least one candidate coding tool. Compared with the conventional solution, the proposed method can advantageously achieve artifacts such as datamoshing artifacts via video coding.

In a second aspect, an apparatus for processing video data is proposed. The apparatus for processing video data comprises a processor and a non-transitory memory with instructions thereon, wherein the instructions upon execution by the processor, cause the processor to perform a method in accordance with the first aspect of the present disclosure.

In a third aspect, a non-transitory computer-readable storage medium is proposed. The non-transitory computer-readable storage medium storing instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus, wherein the method comprises: determining whether an artifact coding tool is enabled, the artifact coding tool being used to generate an artifact effect in the video; in response to the artifact coding tool being enabled, determining at least one candidate coding tool from a plurality of coding tools; and generating the bitstream by enabling the at least one candidate coding tool.

In a fifth aspect, a method for storing a bitstream of a video is proposed. The method comprises: determining whether an artifact coding tool is enabled, the artifact coding tool being used to generate an artifact effect in the video; in response to the artifact coding tool being enabled, determining at least one candidate coding tool from a plurality of coding tools; generating the bitstream by enabling the at least one candidate coding tool; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 4 illustrates an example diagram of a coding flow of HEVC;

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
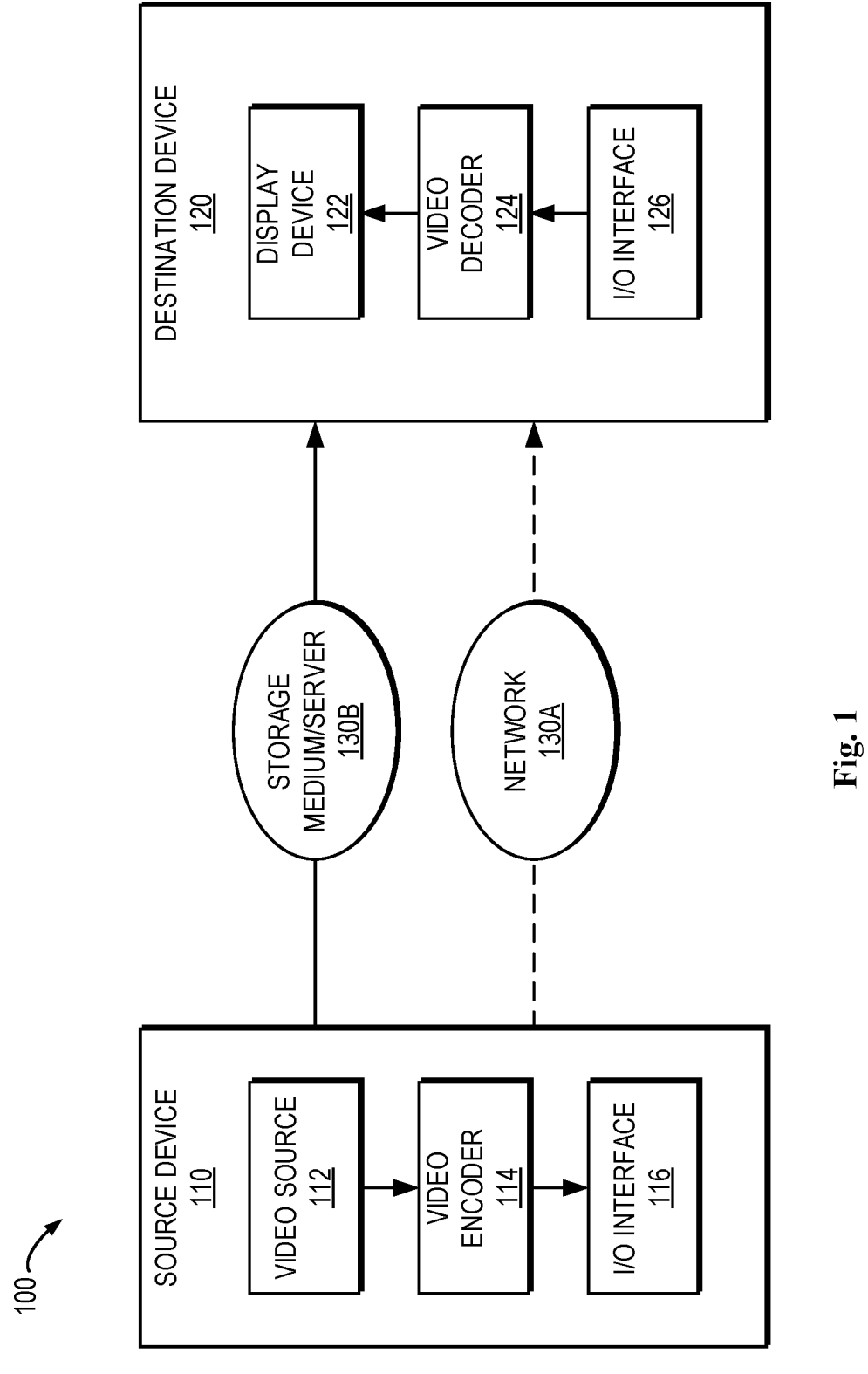
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
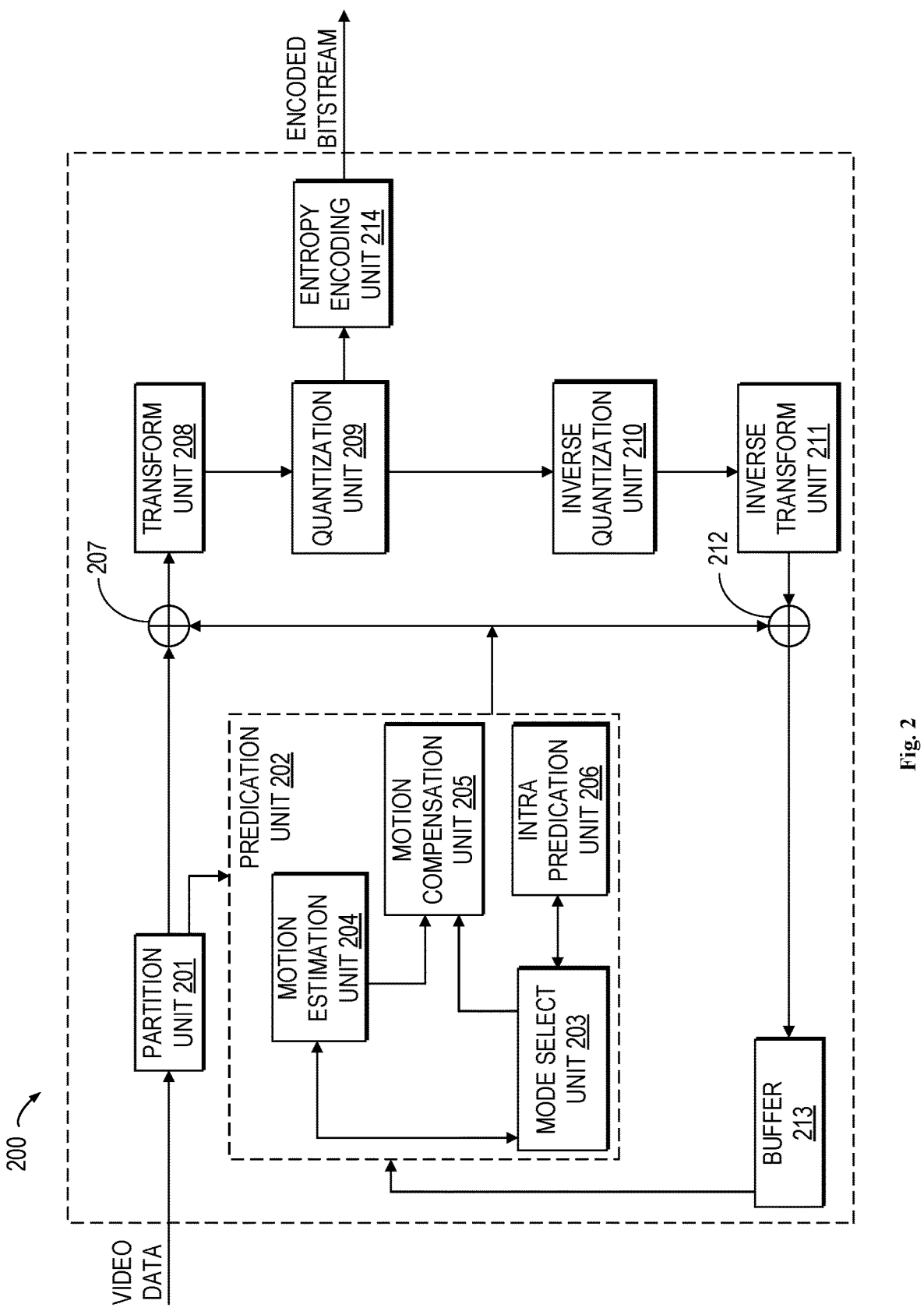
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
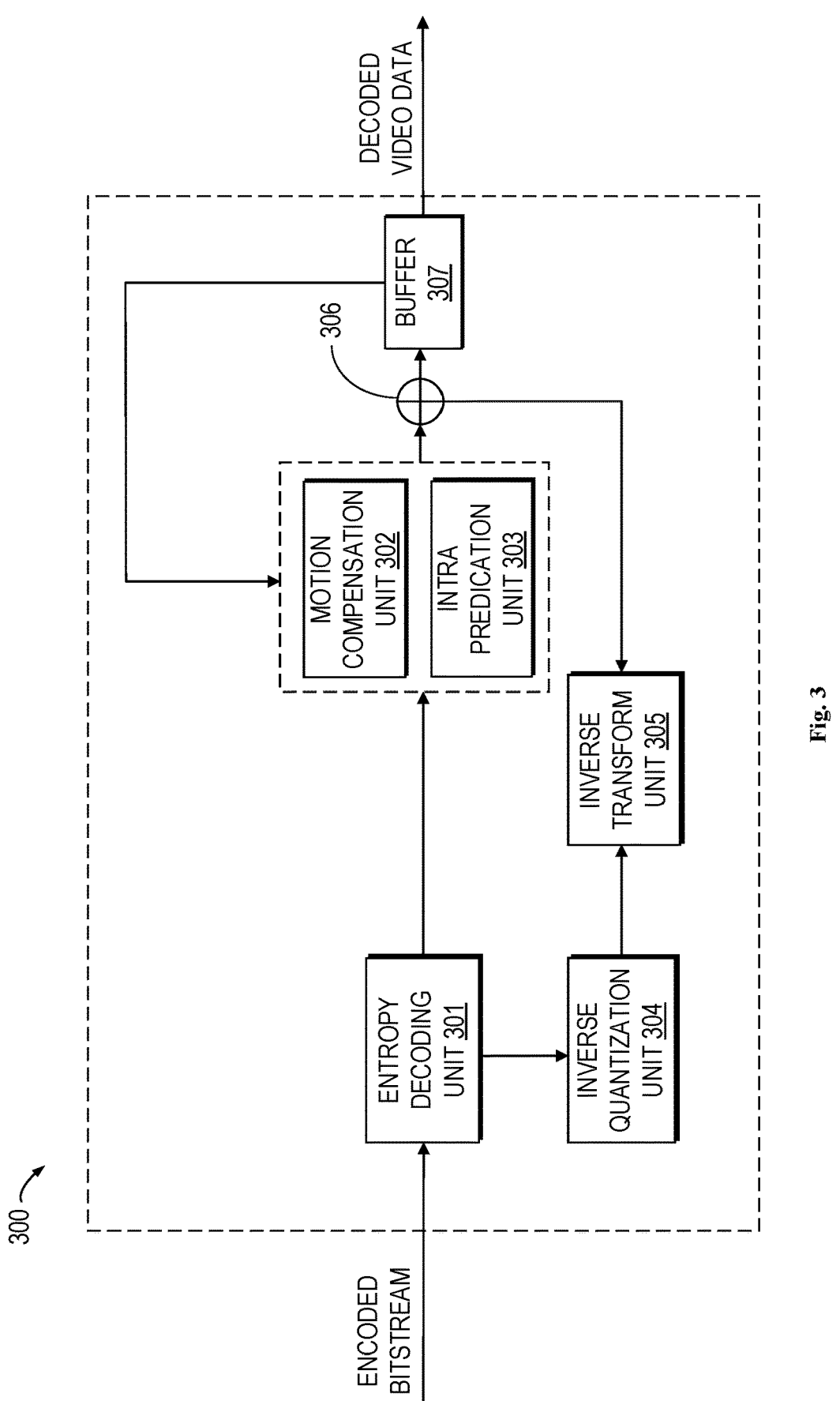
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video encoding and datamoshing. Specifically, it is about how to achieve datamoshing artifacts via video encoding. The ideas may be applied individually or in various combination, to any video coding standard or non-standard video.

2. BACKGROUND 2.1. Video Coding Standards and Encoding Framework

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. FIG. 4 illustrates an example diagram of a coding flow 400 of HEVC. An example of a typical HEVC encoder framework is depicted as FIG. 4.

2.1.1. Picture/Slice Types

H.264 supports three types of pictures/slices, including I/P/B slices/pictures.

An H.264 I-slice is a portion of a picture composed of macroblocks, all of which are based upon macroblocks within the same picture. Thus, H.264 introduces a new concept called slices—segments of a picture bigger than macroblocks but smaller than a frame. Just as there are I-slices, there are P- and B-slices. P- and B-slices are portions of a picture composed of macroblocks that are not dependent on macroblocks in the same picture.

Variable block-size motion compensation (VBSMC) with block sizes as large as 16×16 and as small as 4×4, enabling precise segmentation of moving regions. The supported luma prediction block sizes include 16×16, 16×8, 8×16, 8×8, 8×4, 4×8, and 4×4, many of which can be used together in a single macroblock. Chroma prediction block sizes are correspondingly smaller when chroma subsampling is used.

2.2. Partition Tree Structure in H.264/AVC

The core of the coding layer in previous standards was the macroblock, containing a 16×16 block of luma samples and, in the usual case of 4:2:0 color sampling, two corresponding 8×8 blocks of chroma samples.

An intra-coded block uses spatial prediction to exploit spatial correlation among pixels. Two partitions are defined: 16×16 and 4×4.

Figure 5:
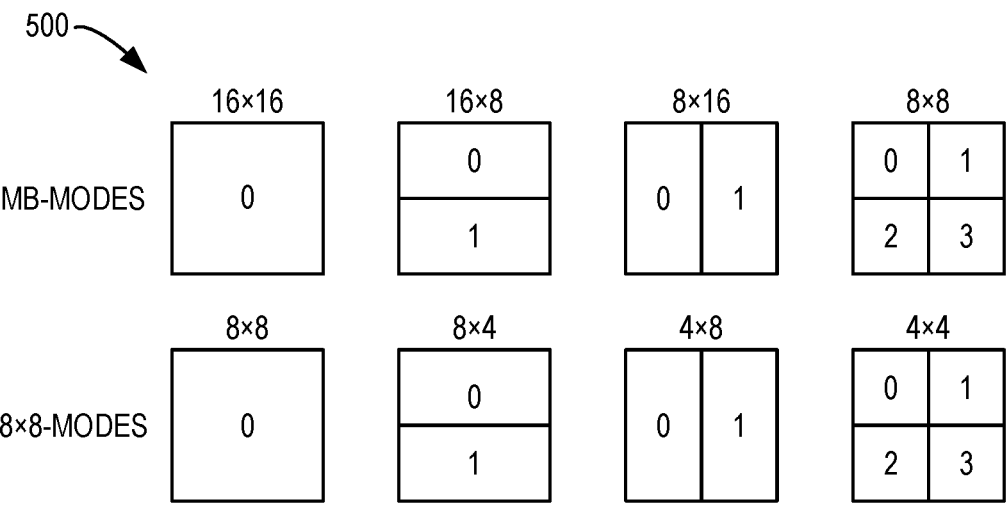
FIG. 5 illustrates examples of MB partitions.

An inter-coded block uses temporal prediction, instead of spatial prediction, by estimating motion among pictures. FIG. 5 illustrates an example diagram 500 of macroblock (MB) partitions. Motion can be estimated independently for either 16×16 macroblock or any of its sub-macroblock partitions: 16×8, 8×16, 8×8, 8×4, 4×8, 4×4 (see FIG. 5). Only one motion vector (MV) per sub-macroblock partition is allowed.

2.3. Partition Tree Structure in HEVC

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU consists of a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

3) Prediction units and prediction blocks (PBs): The decision whether to code a picture area using inter picture or intra picture prediction is made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples.

Figure 6:
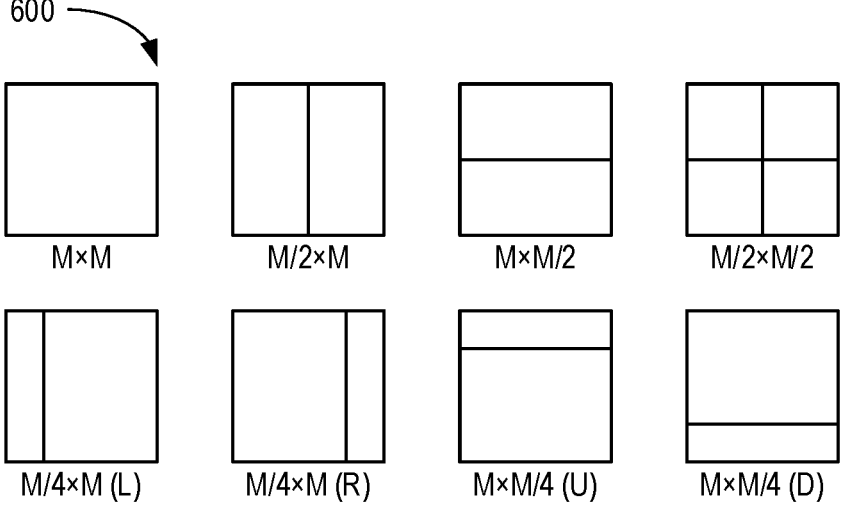
FIG. 6 illustrates examples of modes for splitting a CB into PBs.

FIG. 6 illustrate an example diagram 600 of modes for splitting a CB into PBs, subject to certain size constraints. For intra-picture-predicted CBs, only M×M and M/2×M/2 are supported.

Figures 7A, 7B:
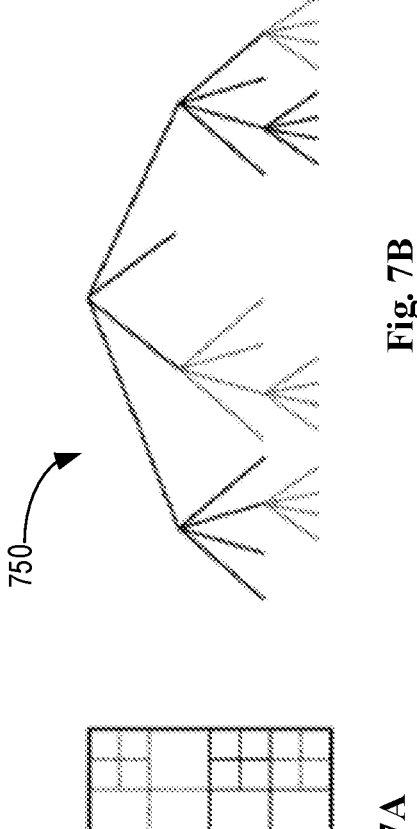
FIGS. 7A and 7B illustrate examples of subdivision of a CTB into CBs.

4) TUs and transform blocks: The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified. FIGS. 7A and 7B illustrate examples of subdivision of a CTB into CBs and transform block (TBs). FIG. 7A illustrates a CTB 700 with its partitioning. FIG. 7B illustrates a quadtree 750 corresponding to the CTB 700. In FIGS. 7A and 7B, solid lines indicate CB boundaries and dotted lines indicate TB boundaries.

2.4. Triple-Tree for VVC

Figures 8, 9:
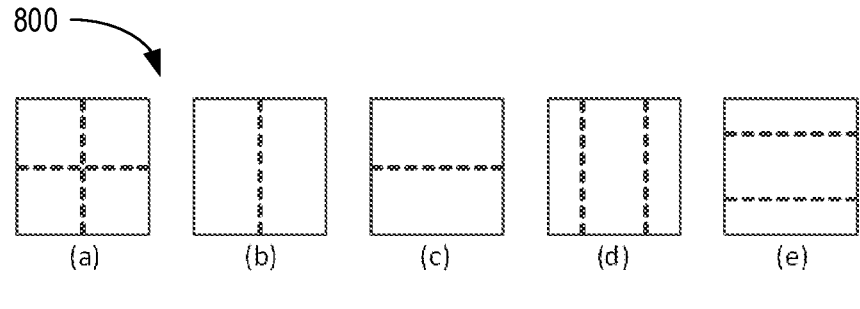
FIG. 8 illustrates examples of tree partitionings.
FIG. 9 illustrates a schematic diagram of a GOP structure.

In VVC, tree types other than quad-tree and binary-tree are supported. FIG. 8 illustrates an example diagram 800 illustrating examples of tree partitions, comprising (a) quad-tree partitioning, (b) vertical binary-tree partitioning, (c) horizontal binary-tree partitioning, (d) vertical center-side triple-tree partitioning, an (e) horizontal center-side triple-tree partitioning. In the implementation, two more triple tree (TT) partitions, i.e., horizontal and vertical center-side triple-trees are introduced, as shown in examples (d) and (e) in FIG. 8.

In VVC, there are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named 'multiple-type-tree'.

2.5. Low-Delay Configuration

For the low-delay configuration, only pictures which are displayed before current picture are allowed to be used as reference pictures.

2.6. Reference Structure of Random Access

For example, consider the coding structure of. This coding structure is of size 4. FIG. 9 illustrates an example diagram 900 of a GOP structure of size 4. The pictures are listed in decoding order. Frame1 shall therefore describe picture with POC=4. It references picture 4. Similarly, Frame2 has a POC of 2, and since it references pictures 0 and 4. Frame3 is a special case: even though it only references pictures with POC 0 and 2, it also needs to include the picture with POC 4, which must be kept in order to be used as a reference picture in the future. The reference picture list for Frame3 therefore becomes –1 1 3. Frame4 has a POC of 3 and its list of reference pictures is –1 1.

2.7. Datamoshing

Datamoshing, a powerful technique in video glitch arts area, is to produce videos with bleeding pixel effect. It was proposed in the film industry and became widely adopted in recent years.

Figure 10:
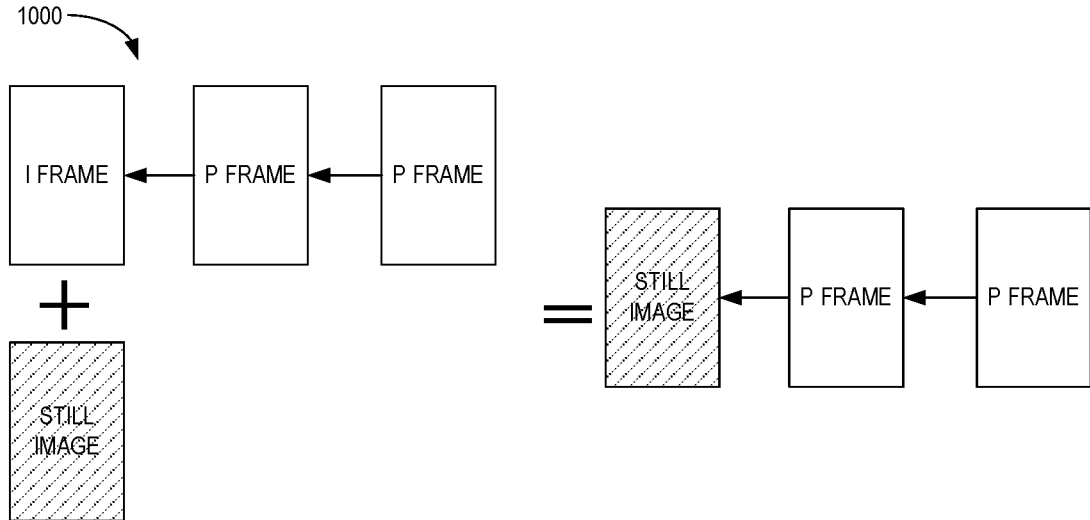
FIG. 10 illustrates a schematic diagram of a process of datamoshing.

Datamoshing generates bleeding pixel effect by combining a video clip with a still image, trying to keep the still image as the video background, while applying the same motion trend from the original video clip. It becomes more intuitive with modern video coding techniques, as the motion trend of the video clip is inherently abstracted via the motion vectors after encoding. FIG. 10 illustrates a schematic diagram of a process 1000 for datamoshing. Typically, the new video clip with the glitch artifacts is created via key frame substitution as shown in FIG. 10. The first image in the video clip is called key frame, which is encoded as Intra Frame (I Frame), and the following images are encoded as Predictive Frame (P Frame or B Frame). By substituting the key frame with the still image, the new video clip would look like with a new background, while keeping the same motion trend as the old video clip.

3. PROBLEMS

The prior arts have the following problems:

1. Glitch artifacts are not well structured and hard to control, simple key frame substitution may not provide the expected effect, as video encoding alone doesn't have any knowledge of datamoshing. Therefore, video encoding with abundant datamoshing information is proposed to perform if available.
2. Motion compensation in video coding is the key to explore inter-frame correlation, however, most of the implementations do motion compensation in the sense of optimal compression efficiency, not to track the real objects movements.

4. DETAILED DESCRIPTIONS

The detailed embodiments below should be considered as examples to explain general concepts. These embodiments should not be interpreted in a narrow way. Furthermore, these embodiments can be combined in any manner.

It should be noted that the proposed solutions could be applied to different video coding standards, even though for certain descriptions, only H.264/AVC is considered.

1. When datamoshing is enabled, certain coding tools may be always disabled.
   a. In one example, the certain coding tool may include in-loop filters, such as deblocking filter, SAO, ALF.
   b. In one example, the certain coding tool may include weighted prediction.
   c. In one example, the certain coding tool may include bi-prediction.
   d. In one example, prediction from backward reference pictures (e.g., those who are displayed after current picture) is disallowed.
2. When datamoshing is enabled, certain coding tools may be always enabled.
   a. In one example, only uni-prediction is allowed.
   b. In one example, the low-delay configuration is enabled.
3. A region-of-interest (ROI) is defined and for samples in the ROI, they may be coded with a limited subset of coding tools while for samples in non-ROI regions, there is no such limitation.

a. In one example, inter prediction is allowed and intra prediction is disallowed for the ROI region.
   b. In one example, uni-prediction is allowed for the ROI region.
4. An Optical Flow (OF) based motion compensation is introduced to conventional video coding framework.
   a. By incorporating optical flow object tracking, encoder is allowed to better keep track of the real motion trend, to offer the expected glitch artifacts.
   b. In one example, the per-pixel OF results may be firstly processed before being cooperated by the conventional video coding framework which is based on block-level motion compensation.
      i. In one example, the average OF-based MVs of all or partial samples within a M×N region is used as the M×N-level MV.
      ii. In one example, the OF-based MV of one representative sample within a M×N region is used as the M×N-level MV.
      iii. In one example, the M and N is set to 4.
      iv. Alternatively, furthermore, the OF-based MV in above examples may be firstly covered to be in certain-precision (e.g., ¼-pel).
5. For samples located in the datamoshing region (e.g., ROI or those area which relies on OF), only inter coding is allowed.
   a. Alternatively, furthermore, only uni-prediction is allowed.
   b. Alternatively, furthermore, all block partitions may be set to the minimum Coding Unit (CU) allowed for inter coding.
      i. Alternatively, furthermore, all block partitions which are coded as inter AMVP mode (e.g., excluding intra mode, merge mode) may be set to the minimum Coding Unit (CU) allowed.
   c. Alternatively, furthermore, all macroblocks may be coded with 4×4 subpartitions.
6. For samples located in the datamoshing region (e.g., ROI or those area which relies on OF), the lambda setting may be different from other samples located outside the datamoshing region.
   a. In one example, lambda used for those inside a ROI may be set to a larger value compared to the lambda used for samples outside the ROI.
   b. In one example, the relationship between that used for the datamoshing region and outside the datamoshing region in the motion estimation process may be set to lambda (inside of ROI)=5×lambda (outside of ROI)
   c. In one example, the relationship between that used for the datamoshing region and outside the datamoshing region in the rate-distortion optimization process may be set to lambda (inside of ROI)=5× lambda (outside of ROI)

5. EMBODIMENTS

5.1. Embodiment #1

Figure 11:
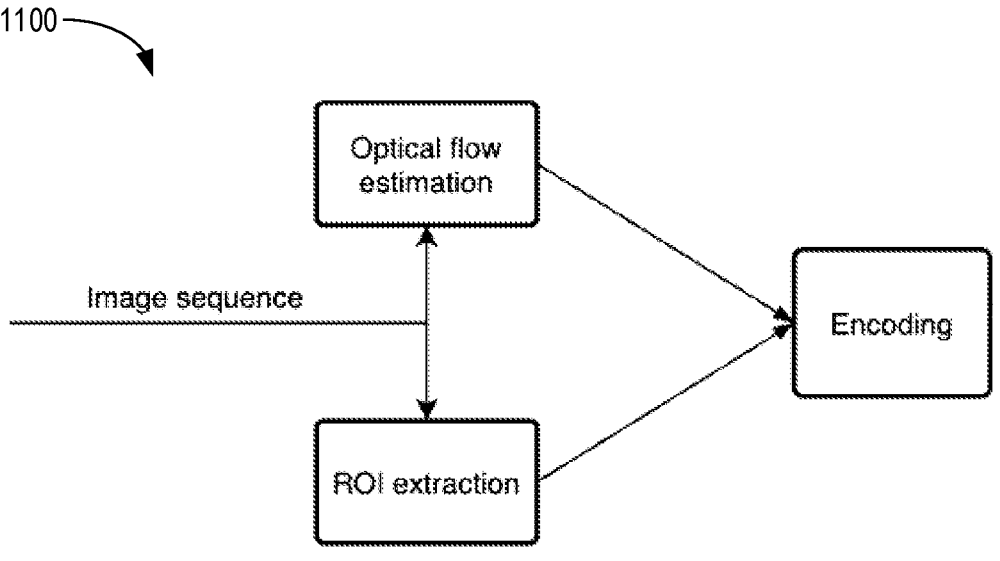
FIG. 11 illustrates a schematic diagram of a process of artifact video coding in accordance with some embodiments of the present disclosure.

An example of embodiment is described as FIG. 11. FIG. 11 illustrates a schematic diagram 1100 of a process of artifact video coding in accordance with some embodiments of the present disclosure.

As shown above, some extra information is extracted to guide datamoshing encoding 1. Optical flow estimation, to track objects' pixel-wise motion. Since motion estimation in video encoding doesn't guarantee to track the object motion in real world, but in the sense of optimal compression efficiency. With advanced optical flow estimation, the objects' real motion can be obtained, then skip motion estimation in further encoding. It worth noting that, video encoders usually represent motion not pixelwise, but block-wise, so a single motion need to be picked for the whole block to make it representable by video encoders. Each video encoder has its smallest block size that it can represent, for example, 4×4 size in H.264/AVC standard, therefore to have the best motion granularity, the encoders should take the smallest block size while encoding. Furthermore, video encoders represent motion vectors in limited precision to have good coding efficiency tradeoff, for example, H.264/AVC represents motion vector at ¼ pixel precision for luma and ⅛ for chroma. Objects' motion in the real world could be an arbitrary floating number, so the motion need to be quantized to the precision the video encoders support at most.

2. Region of Interest (ROI) extraction, to avoid encoding intra blocks in the areas with tracked objects. As the motion trend of the interested objects need to be kept as much as possible, intra mode which breaks inter-frame motion should be avoided in the areas with the tracked objects. Usually, encoders decide to encode a block as intra mode or inter mode just in terms of coding efficiency, so the ROI areas are extracted to guide further encoding. For the area without tracked objects, it will be coded as intra to recover from sudden change.

For the scenarios without extra information, for example due to real time performance concern, the encoding parameteres can be tuned to estimate the real motion as much as possible.

1. Choose the smallest block size to have the best motion granularity.
  2. Motion estimation searches the optimal motion via rate-distortion optimization, that is, searches the motion with the minimal RDcost=distortion+lambda*MVDbits. The distortion is measured by sum of absolute difference. Motion vector is not coded directly, thanks to the motion vector prediction in the modern encoders, only the prediction error (motion vector difference, MVD) is coded, and the motion vector is predicted from adjacent blocks. Lambda is the Lagrange multiplier for the optimization, it affects the tradeoff between distortion and MVDbits. If fewer bits on MVD are invested, the motion being searched would be more consistent among adjacent blocks. Therefore, the lambda can be raised to control the motion vector consistency during motion estimation, and more consistent motion offers better dashmoshing effect.

Embodiments of the present disclosure are related to an artifact video coding tool. As used herein, the term of "artifact video coding tool" or "artifact coding tool" refers to any coding to that generates an artifact effect such as a datamoshing in the video.

As used herein, the term "block" may represent a coding block (CB), a coding unit (CU), a prediction unit (PU), a transform unit (TU), a prediction block (PB), a transform block (TB).

Figure 12:
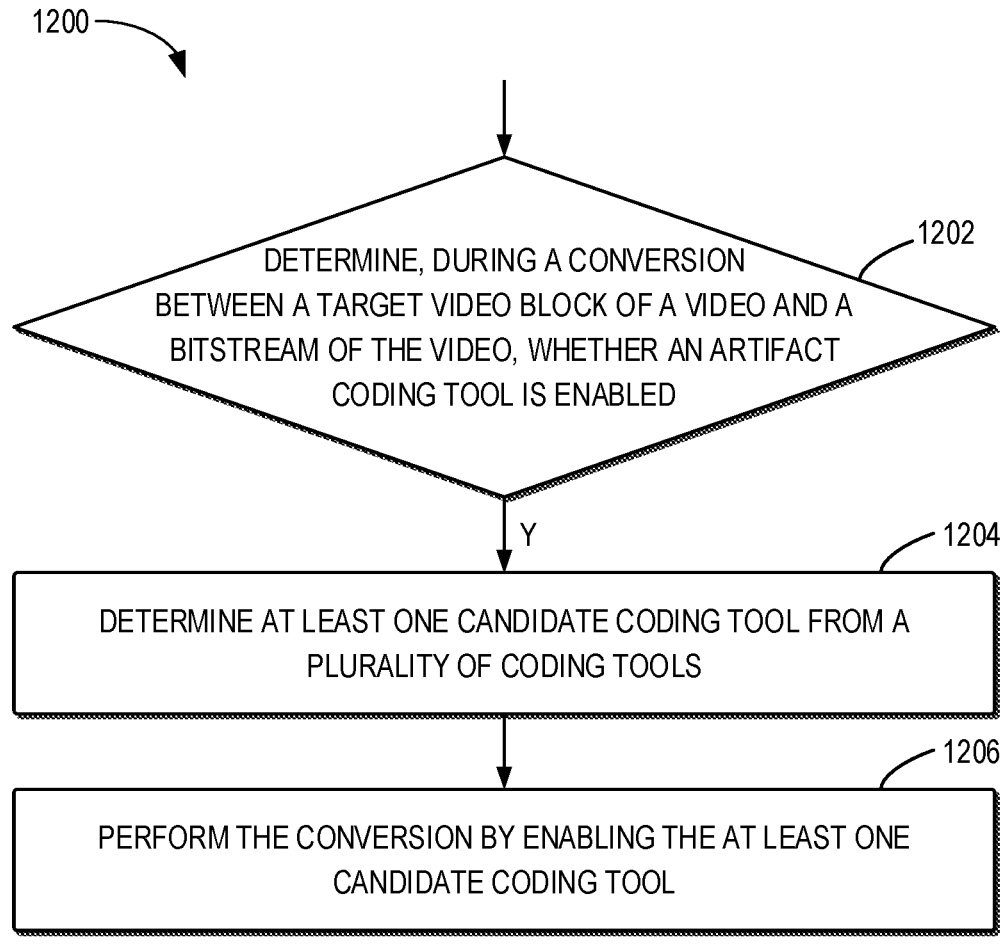
FIG. 12 illustrates a flowchart of a method for video processing in accordance with some embodiments of the present disclosure.

FIG. 12 illustrates a flowchart of a method 1200 for video processing in accordance with some embodiments of the present disclosure. The method 1200 may be implemented during a conversion between a target video block of a video and a bitstream of the video. As shown in FIG. 12, at block 1202, whether an artifact coding tool is enabled is determined. For example, whether a datamoshing coding tool is enabled will be determined. A process of the datamoshing tool is illustrated as FIG. 10.

If it is determined that the artifact coding tool is enabled at block 1202, the method 1200 will proceed with block 1204. At block 1204, at least one candidate coding tool from a plurality of coding tools is determined. At block 1206, the conversion between the target video block and the bitstream is performed by enabling the at least one candidate coding tool. The conversion may include encoding the target video block into the bitstream, or otherwise include decoding the target video block from the bitstream.

According to embodiments of the present disclosure, it is proposed that certain coding tools will be always enabled for the conversion where an artifact such as a datamoshing is to be achieved. In this way, such coding tool can be used to achieve a well structured and satisfying glitch artifacts.

In some embodiments, the at least one candidate coding tool may comprise a uni-prediction tool, or a coding tool with a low delay configuration. For example, in some embodiments, only the uni-prediction is allowed. For another example, the low-delay configuration is enabled.

In some embodiments, a further coding tool may be determined from the plurality of coding tools. The further coding tool is absent from the at least one candidate coding tool. The further coding tool may be disabled. In other words, certain coding tools may be always disabled during the conversion where an artifact is desired.

In some embodiments, the further coding tool may comprise a an in-loop filter. For example, the in-loop filter may comprise a deblocking filter, a sample adaptive offset (SAO) filter, or an adaptive loop filter (ALF). In some embodiments, the further coding tool may comprise a weighted prediction tool. Alternatively, or in addition, the further coding tool may comprise a backward prediction tool predicting from backward reference pictures. The backward reference pictures are displayed after a current picture.

In some embodiments, a region of interest (ROI) may be determined or defined. For samples in the ROI, for example for a first sample of the target video block which is inside the ROI, a first target coding tool from the at least one candidate coding tool may be determined. The first sample may be coded by using the first target coding tool. In other words, those samples inside the ROI may be coded with a limited subset of coding tools while for samples in non-ROI regions, there is no such limitation.

For example, the first target coding tool may comprise an inter prediction tool. An intra prediction tool may be absent from the first target coding tool. In other words, inter prediction is allowed for samples inside the ROI and intra prediction is disallowed for the ROI region. For another example, the first target coding tool may comprise a uni-prediction tool. That is, the uni-prediction is allowed for the ROI region.

In some embodiments, optical flow (OF) information for the target video block may be generated by applying an OF based motion compensation. That is, the OF based motion compensation is introduced to conventional video coding framework. For example, to apply the OF based motion compensation, a motion trend for the target video block may be determined by applying an optical flow object tracking. By incorporating optical flow object tracking, encoder is allowed to better keep track of the real motion trend, thus, to offer the expected glitch artifacts. With such advanced optical flow estimation, the objects' real motion may be obtained, motion estimation in further encoding may be skipped.

In some embodiments, OF information for the target video block may be processed. For example, per-pixel OF information for the target video block may be processed. The target motion information for the target video block may be obtained by combining the processed OF information with block-level motion compensation information for the target video block. In other words, the per-pixel OF results may be firstly processed before being cooperated by the conventional video coding framework which is based on block-level motion compensation.

In some embodiments, the target video block comprises samples in a target region with a size of M times N (M×N). In such cases, an average OF-based motion vector (MV) of all samples or partial samples in the target region may be processed to be a M×N level MV. Alternatively, an OF-based MV of one sample (for example one representative sample) in the target region may be determined to be the M×N level MV. In some embodiments, the OF-based MV for a sample in the target region is of a predetermined precision, such as a ¼-pel precision. In other words, the OF-based MV in above examples may be firstly covered to be in certain precision. In some embodiments, at least one of M and N is set to 4. For example, both M and N may be set to 4. By using block partitions with such a small size, better motion granularity may be obtained.

In some embodiments, an artifact region may be determined. The artifact region may comprise at least one of: a region of interest (ROI) or an optical flow (OF) region. OF information is applied to the OF region. As used herein, the term "artifact region" may be referred to "datamoshing region". The datamoshing region may comprise the ROI or those area which relied on OF. If a second sample of the target video block is inside the artifact region, a second target coding tool may be determined from the at least one candidate coding tool. The second sample may be coded by using the second target coding tool. For example, the second target coding tool may comprise an inter coding tool, or a uni-prediction tool. That is, only inter coding is allowed, or alternatively, only uni-prediction is allowed.

In some embodiments, a coding parameter for a sample inside the artifact region such as the second sample may be adjusted. The second sample may be coded by using the adjusted coding parameter. For example, the coding parameter may comprise a size of a block partition. For example, the coding parameter may be set to be the size of a minimum coding unit (CU) for inter coding. Alternatively, for those block partitions coded as an inter advanced motion vector predication (AMVP) mode excluding an intra mode and a merge mode, the size of the block partition may be set to 4 times 4 (4×4). By tuning the coding parameter, better real motion estimation may be achieved.

In some embodiments, the size of the block partition may be set to 4×4. In such case, a macroblock of the video may be divided into a plurality of subpartitions with the size of 4×4. The plurality of subpartitions may comprise the target video block. In other words, all macroblocks may be coded with 4×4 subpartitions.

Alternatively, or in addition, the coding parameter may comprise a lambda parameter reflecting a Lagrange multiplier. The lambda parameter may affect a tradeoff between a distortion and a motion vector difference (MVD) precision. For samples located in the artifact region such as the ROI or those area which relied on OF, the lambda parameter may be different from other samples outside the artifact region. For example, a first value of the coding parameter for the second sample in the artifact region is larger than a second value of the coding parameter for a third sample outside the artifact region. For example, the first value may be five times of the second value. That is, the lambda used for those inside a ROI may be set to a larger value compared to the lambda used for samples outside the ROI. Raising the lambda may control the motion vector consistency during motion estimation, and more consistent motion offers better datamoshing effect.

In some embodiments, the first value of the coding parameter may be used in at least one of: a motion estimation process, or a rate-distortion optimization process.

In some embodiments, a bitstream of a video may be stored in a non-transitory computer-readable recording medium. The bitstream of the video can be generated by a method performed by a video processing apparatus. According to the method, whether an artifact coding tool is enabled may be determined. The artifact coding tool may be used to generate an artifact effect in the video. In response to the artifact coding tool being enabled, at least one candidate coding tool may be determined from a plurality of coding tools. The bitstream may be generated by enabling the at least one candidate coding tool.

In some embodiments, whether an artifact coding tool is enabled may be determined. The artifact coding tool may be used to generate an artifact effect in the video. In response to the artifact coding tool being enabled, at least one candidate coding tool may be determined from a plurality of coding tools. The bitstream may be generated by enabling the at least one candidate coding tool. The bitstream may be stored in a non-transitory computer-readable recording medium.

Implementations of the present disclosure can be described in view of the following clauses, the features of which can be combined in any reasonable manner.

Clause 1. A method for video processing, comprising: determining, during a conversion between a target video block of a video and a bitstream of the video, whether an artifact coding tool is enabled, the artifact coding tool being used to generate an artifact effect in the video; in response to the artifact coding tool being enabled, determining at least one candidate coding tool from a plurality of coding tools; and performing the conversion by enabling the at least one candidate coding tool.

Clause 2. The method of clause 1, wherein the at least one candidate coding tool comprises at least one of: a uni-prediction tool, or a coding tool with a low delay configuration.

Clause 3. The method of clause 1 or clause 2, further comprising: determining a further coding tool from the plurality of coding tools, the further coding tool being absent from the at least one candidate coding tool; and disabling the further coding tool.

Clause 4. The method of clause 1, wherein the further coding tool comprises at least one of: an in-loop filter, a weighted prediction tool, a bi-prediction tool, or a backward prediction tool predicting from backward reference pictures.

Clause 5. The method of clause 4, wherein the in-loop filter comprises at least one of: a deblocking filter, a sample adaptive offset (SAO) filter, or an adaptive loop filter (ALF).

Clause 6. The method of clause 4, wherein the backward reference pictures are displayed after a current picture.

Clause 7. The method of any of clauses 1-6, further comprising: determining a region of interest (ROI); in response to a first sample of the target video block being inside the ROI, determining a first target coding tool from the at least one candidate coding tool; and wherein performing the conversion comprises: coding the first sample by using the first target coding tool.

Clause 8. The method of clause 7, wherein the first target coding tool comprises an inter prediction tool.

Clause 9. The method of clause 7 or clause 8, wherein an intra prediction tool is absent from the first target coding tool.

Clause 10. The method of any of clauses 7-9, wherein the first target coding tool comprises a uni-prediction tool.

Clause 11. The method of any of clauses 1-10, further comprising: generating optical flow (OF) information for the target video block by applying an OF based motion compensation.

Clause 12. The method of clause 11, wherein applying the OF based motion compensation comprises: determining a motion trend for the target video block by applying an optical flow object tracking.

Clause 13. The method of clause 11 or clause 12, further comprising: processing OF information for the target video block; and obtaining target motion information for the target video block by combining the processed OF information with block-level motion compensation information for the target video block.

Clause 14. The method of clause 13, wherein processing the OF information comprises: processing per-pixel OF information for the target video block.

Clause 15. The method of clause 13 or clause 14, wherein the target video block comprises samples in a target region with a size of M times N; and wherein processing the OF information comprises at least one of: determining an average OF-based motion vector (MV) of all samples in the target region to be a M times N level MV; determining an average OF-based MV of partial samples in the target region to be the M times N level MV; or determining an OF-based MV of one sample in the target region to be the M times N level MV.

Clause 16. The method of clause 15, wherein the OF-based MV for a sample in the target region is of a predetermined precision.

Clause 17. The method of clause 16, wherein the predetermined precision comprises a ¼-pel precision.

Clause 18. The method of any of clauses 15-17, wherein at least one of M and N is set to 4.

Clause 19. The method of any of clauses 1-18, further comprising: determining an artifact region, the artifact region comprising at least one of: a region of interest (ROI) or an optical flow (OF) region, OF information being applied to the OF region; in response to a second sample of the target video block being inside the artifact region, determining a second target coding tool from the at least one candidate coding tool; and wherein performing the conversion comprises: coding the second sample by using the second target coding tool.

Clause 20. The method of clause 19, wherein the second target coding tool comprises one of: an inter coding tool, or a uni-prediction tool.

Clause 21. The method of clause 19 or clause 20, further comprising: adjusting a coding parameter for the second sample; and wherein performing the conversion comprises: coding the second sample by using the adjusted coding parameter.

Clause 22. The method of clause 21, wherein the coding parameter comprises a size of a block partition.

Clause 23. The method of clause 22, wherein adjusting the coding parameter comprises: setting the coding parameter to be the size of a minimum coding unit (CU) for inter coding.

Clause 24. The method of clause 23, wherein the block partition is coded as an inter advanced motion vector prediction (AMVP) mode.

Clause 25. The method of clause 24, wherein an intra mode and a merge mode is absent from the inter AMVP mode.

Clause 26. The method of clause 22, wherein the size of the block partition is set to 4 times 4.

Clause 27. The method of clause 26, further comprising: dividing a macroblock of the video into a plurality of subpartitions with the size of 4 times 4, the plurality of subpartitions comprising the target video block.

Clause 28. The method of any of clauses 21-27, wherein the coding parameter comprises: a lambda parameter reflecting a Lagrange multiplier, the lambda parameter affecting a tradeoff between a distortion and a motion vector difference (MVD) precision.

Clause 29. The method of clause 28, wherein a first value of the coding parameter for the second sample in the artifact region is larger than a second value of the coding parameter for a third sample outside the artifact region.

Clause 30. The method of clause 29, wherein the first value is five times of the second value.

Clause 31. The method of clause 29 or clause 30, wherein the first value of the coding parameter is used in at least one of: a motion estimation process, or a rate-distortion optimization process.

Clause 32. The method of any of clauses 1-31, wherein the artifact coding tool comprises a datamoshing coding tool.

Clause 33. The method of any of clauses 1-32, wherein the conversion includes encoding the target video block into the bitstream.

Clause 34. The method of any of clauses 1-32, wherein the conversion includes decoding the target video block from the bitstream.

Clause 35. An apparatus for processing video data comprising a processor and a non-transitory memory with instructions thereon, wherein the instructions upon execution by the processor, cause the processor to perform a method in accordance with any of Clauses 1-34.

Clause 36. A non-transitory computer-readable storage medium storing instructions that cause a processor to perform a method in accordance with any of Clauses 1-34.

Clause 37. A non-transitory computer-readable recording medium storing a bitstream of a video which is generated by a method performed by a video processing apparatus, wherein the method comprises: determining whether an artifact coding tool is enabled, the artifact coding tool being used to generate an artifact effect in the video; in response to the artifact coding tool being enabled, determining at least one candidate coding tool from a plurality of coding tools; and generating the bitstream by enabling the at least one candidate coding tool.

Clause 38. A method for storing a bitstream of a video, comprising: determining whether an artifact coding tool is enabled, the artifact coding tool being used to generate an artifact effect in the video; in response to the artifact coding tool being enabled, determining at least one candidate coding tool from a plurality of coding tools; generating the bitstream by enabling the at least one candidate coding tool; and storing the bitstream in a non-transitory computer-readable recording medium.

Example Device

Figure 13:
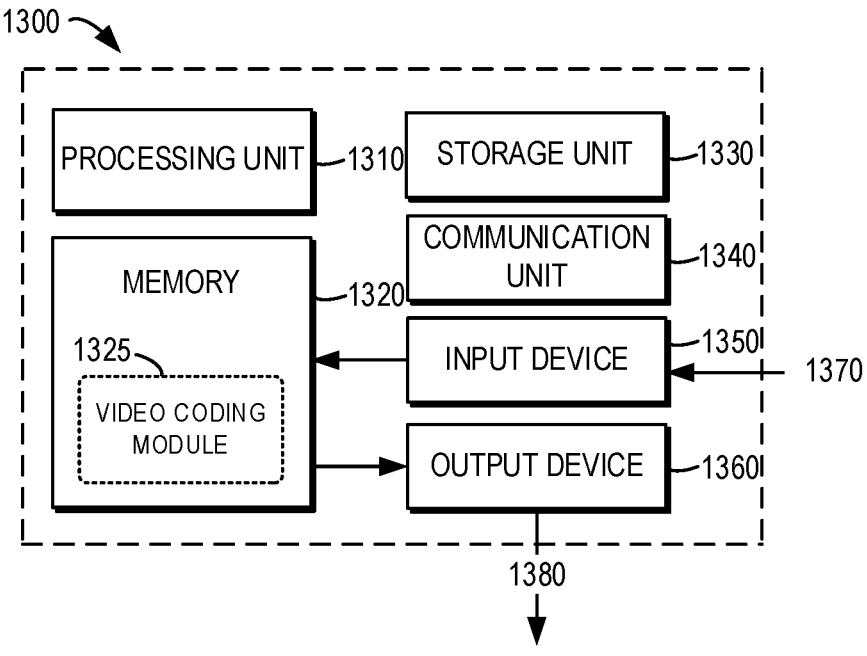
FIG. 13 illustrates a block diagram of a computing device in which various embodiments of the present disclosure can be implemented.

FIG. 13 illustrates a block diagram of a computing device 1300 in which various embodiments of the present disclosure can be implemented. The computing device 1300 may be implemented as or included in the source device 110 (or the video encoder 114 or 200) or the destination device 120 (or the video decoder 124 or 300).

It would be appreciated that the computing device 1300 shown in FIG. 13 is merely for purpose of illustration, without suggesting any limitation to the functions and scopes of the embodiments of the present disclosure in any manner.

As shown in FIG. 13, the computing device 1300 includes a general-purpose computing device 1300. The computing device 1300 may at least comprise one or more processors or processing units 1310, a memory 1320, a storage unit 1330, one or more communication units 1340, one or more input devices 1350, and one or more output devices 1360.

In some embodiments, the computing device 1300 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1300 can support any type of interface to a user (such as "wearable" circuitry and the like).

The processing unit 1310 may be a physical or virtual processor and can implement various processes based on programs stored in the memory 1320. In a multi-processor system, multiple processing units execute computer executable instructions in parallel so as to improve the parallel processing capability of the computing device 1300. The processing unit 1310 may also be referred to as a central processing unit (CPU), a microprocessor, a controller or a microcontroller.

The computing device 1300 typically includes various computer storage medium. Such medium can be any medium accessible by the computing device 1300, including, but not limited to, volatile and non-volatile medium, or detachable and non-detachable medium. The memory 1320 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1330 may be any detachable or non-detachable medium and may include a machine-readable medium such as a memory, flash memory drive, magnetic disk or another other media, which can be used for storing information and/or data and can be accessed in the computing device 1300.

The computing device 1300 may further include additional detachable/non-detachable, volatile/non-volatile memory medium. Although not shown in FIG. 13, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1340 communicates with a further computing device via the communication medium. In addition, the functions of the components in the computing device 1300 can be implemented by a single computing cluster or multiple computing machines that can communicate via communication connections. Therefore, the computing device 1300 can operate in a networked environment using a logical connection with one or more other servers, networked personal computers (PCs) or further general network nodes.

The input device 1350 may be one or more of a variety of input devices, such as a mouse, keyboard, tracking ball, voice-input device, and the like. The output device 1360 may be one or more of a variety of output devices, such as a display, loudspeaker, printer, and the like. By means of the communication unit 1340, the computing device 1300 can further communicate with one or more external devices (not shown) such as the storage devices and display device, with one or more devices enabling the user to interact with the computing device 1300, or any devices (such as a network card, a modem and the like) enabling the computing device 1300 to communicate with one or more other computing devices, if required. Such communication can be performed via input/output (I/O) interfaces (not shown).

In some embodiments, instead of being integrated in a single device, some or all components of the computing device 1300 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1300 may be used to implement video encoding/decoding in embodiments of the present disclosure. The memory 1320 may include one or more video coding modules 1325 having one or more program instructions. These modules are accessible and executable by the processing unit 1310 to perform the functionalities of the various embodiments described herein.

In the example embodiments of performing video encoding, the input device 1350 may receive video data as an input 1370 to be encoded. The video data may be processed, for example, by the video coding module 1325, to generate an encoded bitstream. The encoded bitstream may be provided via the output device 1360 as an output 1380.

In the example embodiments of performing video decoding, the input device 1350 may receive an encoded bitstream as the input 1370. The encoded bitstream may be processed, for example, by the video coding module 1325, to generate decoded video data. The decoded video data may be provided via the output device 1360 as the output 1380.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
determining, during a conversion between a target video block of a video and a bitstream of the video, whether an artifact coding tool is enabled, the artifact coding tool being used to generate an artifact effect in the video;
in response to the artifact coding tool being enabled, determining at least one candidate coding tool from a plurality of coding tools, the at least one candidate coding tool being enabled for the conversion;
determining an artifact region, the artifact region comprising at least one of: a region of interest (ROI) or an optical flow (OF) region, OF information being applied to the OF region;
in response to a sample of the target video block being inside the artifact region, determining a target coding tool from the at least one candidate coding tool, wherein the target coding tool comprises one of: an inter coding tool, or a uni-prediction tool; and
performing the conversion with the target coding tool.

2. The method of claim 1, wherein the at least one candidate coding tool comprises at least one of:
a uni-prediction tool, or
a coding tool with a low delay configuration.

3. The method of claim 1, further comprising:
determining a further coding tool from the plurality of coding tools, the further coding tool being absent from the at least one candidate coding tool; and
disabling the further coding tool,
wherein the further coding tool comprises at least one of: an in-loop filter, a weighted prediction tool, a bi-prediction tool, or a backward prediction tool predicting from backward reference pictures.

4. The method of claim 3, wherein the in-loop filter comprises at least one of: a deblocking filter, a sample adaptive offset (SAO) filter, or an adaptive loop filter (ALF), or
wherein the backward reference pictures are displayed after a current picture.

5. The method of claim 1, further comprising:
determining the ROI; and
in response to a first sample of the target video block being inside the ROI, determining a first target coding tool from the at least one candidate coding tool,
wherein performing the conversion comprises: coding the first sample by using the first target coding tool, wherein the first target coding tool comprises an inter prediction tool,
wherein an intra prediction tool is absent from the first target coding tool, or
wherein the first target coding tool comprises a uni-prediction tool.

6. The method of claim 1, further comprising:
generating OF information for the target video block by applying an OF based motion compensation,
wherein applying the OF based motion compensation comprises: determining a motion trend for the target video block by applying an optical flow object tracking.

7. The method of claim 6, further comprising:
processing OF information for the target video block; and
obtaining target motion information for the target video block by combining the processed OF information with block-level motion compensation information for the target video block,
wherein processing the OF information comprises: processing per-pixel OF information for the target video block.

8. The method of claim 7, wherein the target video block comprises samples in a target region with a size of M times N, and
wherein processing the OF information comprises at least one of:
determining an average OF-based motion vector (MV) of all samples in the target region to be a M times N level MV;
determining an average OF-based MV of partial samples in the target region to be the M times N level MV; or
determining an OF-based MV of one sample in the target region to be the M times N level MV.

9. The method of claim 8, wherein the OF-based MV for a sample in the target region is of a predetermined precision, or
wherein the predetermined precision comprises a ¼-pel precision, or
wherein at least one of M and N is set to 4.

10. The method of claim 1, further comprising:
adjusting a coding parameter for the sample, and
wherein performing the conversion comprises: coding the sample by using the adjusted coding parameter.

11. The method of claim 10, wherein the coding parameter comprises a size of a block partition,
wherein adjusting the coding parameter comprises: setting the coding parameter to be the size of a minimum coding unit (CU) for inter coding, or
wherein the block partition is coded as an inter advanced motion vector predication (AMVP) mode, or
wherein an intra mode and a merge mode is absent from the inter AMVP mode, or
wherein the size of the block partition is set to 4 times 4.

12. The method of claim 11, further comprising:
dividing a macroblock of the video into a plurality of subpartitions with the size of 4 times 4, the plurality of subpartitions comprising the target video block.

13. The method of claim 10, wherein the coding parameter comprises: a lambda parameter reflecting a Lagrange multiplier, the lambda parameter affecting a tradeoff between a distortion and a motion vector difference (MVD) precision,
wherein a first value of the coding parameter for the sample in the artifact region is larger than a second value of the coding parameter for a further sample outside the artifact region.

14. The method of claim 13, wherein the first value is five times of the second value, or
wherein the first value of the coding parameter is used in at least one of: a motion estimation process, or a rate-distortion optimization process.

15. The method of claim 1, wherein the artifact coding tool comprises a datamoshing coding tool.

16. The method of claim 1, wherein the conversion includes encoding the target video block into the bitstream, or wherein the conversion includes decoding the target video block from the bitstream.

17. An apparatus for processing video data comprising a processor and a non-transitory memory with instructions thereon, wherein the instructions upon execution by the processor, cause the processor to:

determine, during a conversion between a target video block of a video and a bitstream of the video, whether an artifact coding tool is enabled, the artifact coding tool being used to generate an artifact effect in the video;

in response to the artifact coding tool being enabled, determine at least one candidate coding tool from a plurality of coding tools, the at least one candidate coding tool being enabled for the conversion;

determine an artifact region, the artifact region comprising at least one of: a region of interest (ROI) or an optical flow (OF) region, OF information being applied to the OF region;

in response to a sample of the target video block being inside the artifact region, determine a target coding tool from the at least one candidate coding tool, wherein the target coding tool comprises one of: an inter coding tool, or a uni-prediction tool; and perform the conversion with the target coding tool.

18. A non-transitory computer-readable storage medium storing instructions that cause a processor to perform a method performed by a video processing apparatus, wherein the method comprises:

determining, during a conversion between a target video block of a video and a bitstream of the video, whether an artifact coding tool is enabled, the artifact coding tool being used to generate an artifact effect in the video;

in response to the artifact coding tool being enabled, determining at least one candidate coding tool from a plurality of coding tools, the at least one candidate coding tool being enabled for the conversion;

determining an artifact region, the artifact region comprising at least one of: a region of interest (ROI) or an optical flow (OF) region, OF information being applied to the OF region;

in response to a sample of the target video block being inside the artifact region, determining a target coding tool from the at least one candidate coding tool, wherein the target coding tool comprises one of: an inter coding tool, or a uni-prediction tool; and performing the conversion with the target coding tool.

19. A method for storing a bitstream of a video, comprising:

determining whether an artifact coding tool is enabled, the artifact coding tool being used to generate an artifact effect in the video;

in response to the artifact coding tool being enabled, determining at least one candidate coding tool from a plurality of coding tools, the at least one candidate coding tool being enabled for the conversion;

determining an artifact region, the artifact region comprising at least one of: a region of interest (ROI) or an optical flow (OF) region, OF information being applied to the OF region;

in response to a sample of the target video block being inside the artifact region, determining a target coding tool from the at least one candidate coding tool, wherein the target coding tool comprises one of: an inter coding tool, or a uni-prediction tool;

generating the bitstream with the target coding tool; and storing the bitstream in a non-transitory computer-readable recording medium.

\* \* \* \* \*